United States Patent Office
2,894,418
Patented July 14, 1959

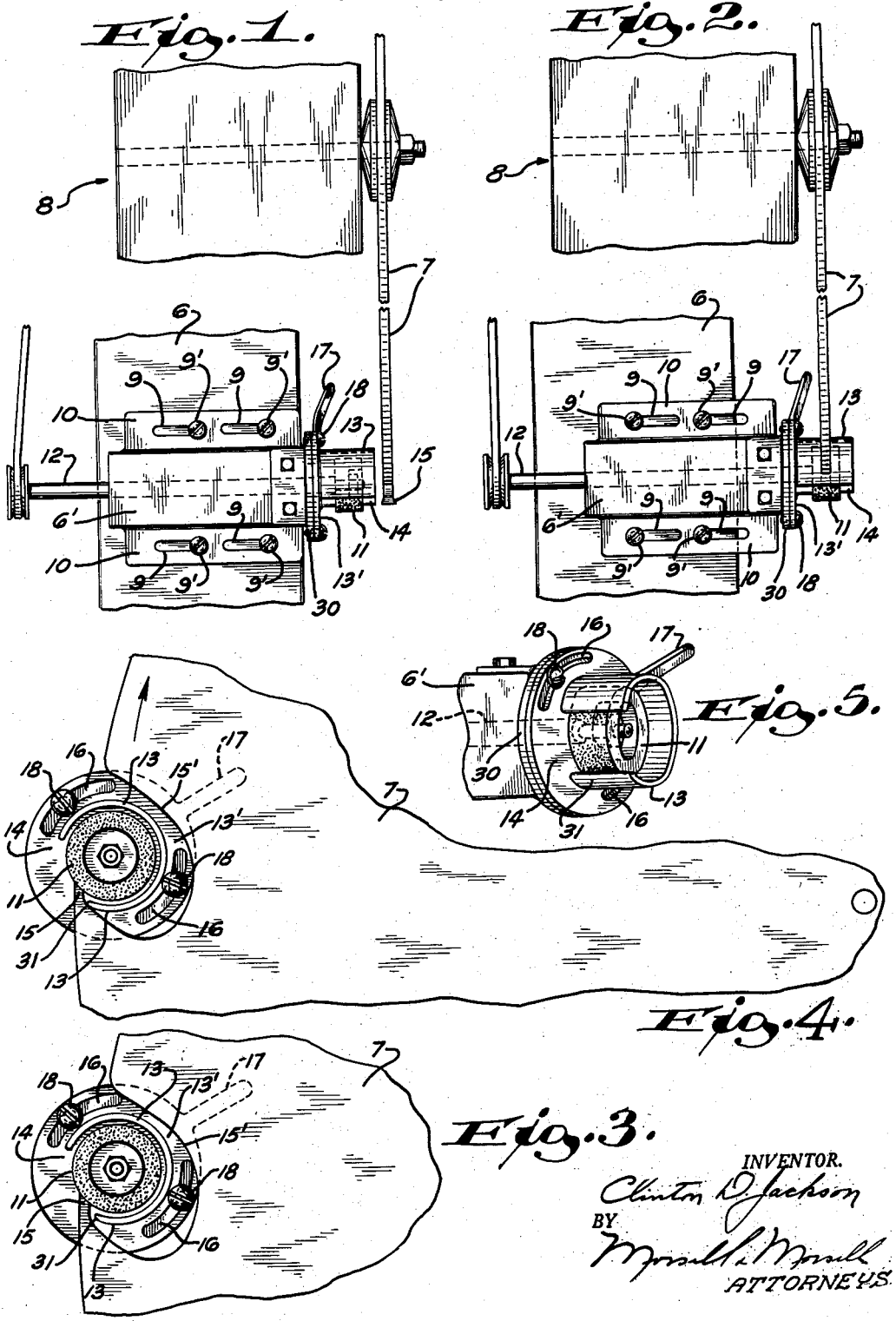

2,894,418

SAW BLADE SHARPENERS

Clinton D. Jackson, Mondovi, Wis.

Application July 29, 1957, Serial No. 674,922

6 Claims. (Cl. 76—37)

This invention relates to improvements in saw blade sharpeners, and more particularly to a rotary grinder adapted to be mounted on a saw for use in sharpening the teeth of a circular saw blade.

Rotary grinders customarily used for sharpening circular saw blades are inefficient and unsatisfactory for the reason that accurate and uniform grinding of successive teeth is difficult to achieve because the operator of a conventional sharpener has to rely on his own rough estimate in regard to the desired depth of grind for each individual tooth of the saw blade. The result is often a tooth that is over- or under-ground in relation to the other teeth of the blade, thereby diminishing the cutting quality and trueness of the blade. Sharpeners have been devised in the past which have sought to eliminate this problem, but they have been ineffective and subject to the objection that they are too complex to be practical.

It is, therefore, a general object of the present invention to provide an efficient and relatively simple circular saw blade sharpener of the rotary grinding wheel type, so constructed and arranged that every tooth or bit of a saw blade can be ground uniformly to exactly the same depth and angle, and the same distance from the center of the saw.

A more specific object of the present invention is to provide an improved circular saw blade sharpener of the type described, wherein the entire sharpening assembly is mounted on the saw frame to insure a definite and uniform relation to the axis of the saw. In addition, the grinding wheel is mounted in a manner permitting its lateral movement in a plane perpendicular to the face of the saw blade, thereby allowing the grinding wheel to be temporarily withdrawn while the blade is rotated to bring the next tooth into position for grinding.

A further and important object of the invention is to provide a saw blade sharpener of the type described, wherein the rotary grinding wheel is partly enclosed in a rotatably adjustable shield or collar, which has a gap in its periphery having a transverse edge which acts as a guage to accurately position and set each tooth, the collar unit being rotatably adjustable in a limited manner in a plane parallel to that in which the grinding wheel revolves. In practice, the collar is rotated to a degree wherein the gap is in position to receive a predetermined extent of the tooth to be sharpened, and the collar is then set by means of two opposed set screws. By setting the collar in this simple and expeditious manner grinding of exactly the same amount of metal from each tooth in the blade is insured. In addition, the novel collar arrangement effectively prevents the grinding wheel from contacting parts which it is not desired to grind.

Further objects of the invention are to provide an improved circular saw blade sharpener which is durable, simple in operation, inexpensive to manufacture, and which is otherwise well adapted for the purposes described.

With the above and other objects in view, the invention consists of the improved circluar saw blade sharpener, and all of its parts and combinations as set forth in the claims, and all equivalents thereof.

In the accompanying drawing, illustrating one complete embodiment of the preferred power of the invention in which the same reference characters designate the same parts in all of the views:

Fig. 1 is a fragmentary top view of a saw with the sharpening unit attached to the frame thereof showing its mounting relation to a saw axis, and showing the grinding wheel laterally retracted from the saw blade;

Fig. 2 is a similar fragmentary view showing, however, the grinding wheel in its laterally shifted, or operative, position in relation to the blade;

Fig. 3 is a fragmentary side view of the saw blade showing a saw tooth in sharpening position against the grinding wheel;

Fig. 4 is a similar fragmentary side view at the end of a tooth sharpening operation showing the transverse edge of the gap acting as a stop to prevent further feed movement of the tooth; and Fig. 5 is a perspective view of the grinding wheel and collar massembly.

Referring more particularly to the drawing, the device comprises a support 6 suitably fixed to a saw frame 8 and having a sharpening unit frame 6' mounted so as to be a predetermined fixed distance outward from the axis of rotation of the saw 7. The frame is, however, movable and settable laterally in a plane perpendicular with the face of a saw blade 7 by means of slots 9 and set screws 9', the slots being located in flanges 10 of the sharpening unit 6'.

A grinding wheel 11 is secured to a suitably journaled, power driven rotatable shaft 12, and is partly enclosed by a gauge collar 13. The gauge collar has a peripheral gap 14 extending approximately ⅕ or ⅙ of the way around its circumference to permit engagement of a saw tooth such as the saw tooth 15 with the grinding wheel 11, as shown in Figs. 3 and 4 with the grinding wheel received in the gullet recess 15' of the saw. An end of the collar is fixed to a disk 13' having arcuate slots 16. The disk 13' frictionally engages an end disk 30 fixed to the frame of the sharpening unit. Screws 18 projecting from the fixed disk 30 coact with the slots 16 and may be tightened to lock the rotatable disk 13' and collar 13 in a desired position of adjustment.

In practice, the sharpening unit is in its retracted position, as shown in Fig. 1, while the saw blade is being indexed to bring a tooth into position for grinding. When the blade is in proper position, the sharpening unit is urged laterally outwardly to engage the blade, as shown in Fig. 2, and the screws 9' may be tightened if desired to hold it in operative position. The collar is then adjustably rotated by the handle 17 and set to allow a predetermined amount of metal to be ground from the saw tooth, as appears in Fig. 3. The grinding action is then commenced and the saw blade manually urged in a constant upward direction against the grinding wheel until further upward movement of the blade is checked by the transverse edge 31 of the collar, as shown in Fig. 4. At this point a predetermined amount of metal has been ground off of the end of the tooth 15. The grinding unit is then retracted, the succeeding saw tooth brought into position, and the grinding operation repeated. This procedure is repeated with each tooth and, after the initial setting, the fixed position of the collar insures accurate and uniform grinding of all teeth.

Various changes and modifications may be made without departing from the spirit of the invention, and all of such changes are contemplated as may come within the scope of the claims.

What I claim is:

1. A sharpening unit for a circular gulleted saw blade while in position on a saw comprising a small rotatable grinding wheel of a diameter to be accommodated within a gullet of a saw blade with which it is to be used, means providing for mounting of said grinding wheel in a position which is a predetermined fixed distance radially outward from the axis of rotation of a saw blade, said mounting means also providing for lateral axial movement of the grinding wheel toward and away from the face of the saw blade into and out of grinding position in a gullet of a saw tooth, and a guage member supported adjacent the periphery of said grinding wheel for adjustable movement around the axis of the grinding wheel and for lateral movement with the grinding wheel to a position within the gullet of a saw tooth where the gauge member is in the path of rotatable movement of an edge portion of the gullet of the saw tooth and between said gullet edge and the periphery of the grinding wheel and thereby serve as a stop after a predetermined amount of grinding to control the depth of grind on the saw tooth.

2. A sharpening unit for a circular gulleted saw blade while in position on a saw comprising a small rotatable grinding wheel of a diameter to be accommodated within a gullet of a saw blade with which it is to be used, means providing for mounting of said grinding wheel in a position which is a predetermined fixed distance radially outward from the axis of rotation of a saw blade, said mounting means also providing for lateral axial movement of the grinding wheel toward and away from the face of the saw blade into and out of grinding position in a gullet of a saw tooth, a collar supported in a position surrounding said grinding wheel and having a peripheral gap to provide for entrance of a saw tooth into contact with the periphery of the grinding wheel when the major portion of the collar is within a gullet, said collar having a transverse edge at one end of said gap which is adapted to serve as a guage, and means providing for lateral movement of the collar with the grinding wheel to a position where said guage edge will be within the gullet of a saw tooth in the path of rotatable movement of the edge of the gullet after a predetermined amount of grinding to control the depth of grind on the saw tooth.

3. A sharpening unit for a circular gulleted saw blade while in position on a saw comprising a sharpening unit frame, means on said frame providing for mounting of the same a predetermined fixed distance radially outward from the axis of rotation of a saw blade, said mounting means also providing for lateral movement of the sharpening unit frame toward and away from the plane of the face of a saw blade, a small grinding wheel of a diameter to be accommodated within a gullet of a saw blade with which it is to be used rotatably carried by said sharpening unit frame in a position to be moved axially into and out of grinding position in a gullet of a saw tooth when said frame is laterally moved, a collar surrounding the grinding wheel and having a peripheral gap, and means for adjustably securing the collar to the sharpening unit frame for rotatable adjustable movement around the axis of the grinding wheel, where being a transverse edge on the collar at an end of said gap serving as a gauge positioned to be within the gullet of a saw tooth within the path of rotatable movement of an edge of said gullet of a saw tooth to serve as a stop after a predetermined amount of grinding to control the depth of grind on the saw tooth in accordance with the position of rotatable adjustment of the collar.

4. A sharpening unit for a circular gulleted saw blade while in position on a saw comprising a sharpening unit frame having slots, means cooperating with said slots for mounting of the sharpening unit frame a predetermined fixed distance radially outward from the axis of rotation of a saw blade while providing for lateral movement of the sharpening unit frame toward and away from the plane of the face of the saw blade in the direction of extent of said slots, a small grinding wheel of a diameter to be accommodated within a gullet of a saw blade with which it is to be used rotatably carried by said sharpening unit frame in a position to be moved axially into and out of grinding position in a gullet of a saw tooth when said frame is laterally moved, a collar surrounding the grinding wheel and having a peripheral gap, and means for adjustably securing the collar to the sharpening unit frame for rotatable adjustable movement around the axis of the grinding wheel, there being a transverse edge on the collar at an end of said gap serving as a guage which is located to be in the path of rotatable movement of the gullet of a saw tooth to serve as a stop after a predetermined amount of grinding to control the depth of grind on the saw tooth in accordance with the position of rotatable adjustment of the collar.

5. A sharpening unit for a circular gulleted saw blade while in position on a saw comprising a sharpening unit frame, means on said frame providing for mounting of the same a predetermined fixed distance radially outward from the axis of rotation of a saw blade, said mounting means also providing for lateral movement of the sharpening unit frame toward and away from the plane of the face of the saw blade, a small grinding wheel of a diameter to be accommodated within a gullet of a saw blade with which it is to be used rotatably carried by said sharpening unit frame in a position to be moved axially into and out of grinding position in a gullet of a saw tooth when said frame is laterally moved, a collar surrounding the grinding wheel and having a peripheral gap, means including a slotted disk to which the inner end of the collar is connected for adjustably securing the collar to the sharpening unit frame for rotatable adjustable movement around the axis of the grinding wheel, there being a transverse edge on the collar at an end of said gap serving as a guage which is located to be in the path of rotatable movement of the edge of the gullet of a saw tooth to serve as a stop after a predetermined amount of grinding to thereby control the depth of grind on the saw tooth in accordance with the position of rotatable adjustment of the collar.

6. A sharpening unit for a circular gulleted saw blade while in position on a saw comprising a sharpening unit frame, means on said frame providing for mounting of the same a predetermined fixed distance radially outward from the axis of rotation of a saw blade, said mounting means also providing for lateral movement of the sharpening unit frame toward and away from the plane of the face of the saw blade, a small grinding wheel of a diameter to be accommodated within a gullet of a saw blade with which it is to be used rotatably carried by said sharpening unit frame in a position to be moved into and out of grinding position in a gullet of a saw tooth when said frame is laterally moved, a collar surrounding the grinding wheel and having a peripheral gap, a disk to which an end of the collar is connected, said disk having oppositely disposed arcuate slots, means extending through said slots for adjustably securing the collar to the sharpening unit frame for rotatable adjustable movement around the axis of the grinding wheel, there being a transverse edge on the collar at an end of said gap serving as a guage which is located to be in the path of rotatable movement of the edge of the gullet of a saw tooth to serve as a stop after a predetermined amount of grinding to thereby control the depth of grind on the saw tooth in accordance with the position of rotatable adjustment of the collar.

References Cited in the file of this patent

UNITED STATES PATENTS

| | | |
|---|---|---|
| 1,134,833 | Fischer et al. | Apr. 6, 1915 |
| 1,372,033 | Marschke et al. | Mar. 22, 1921 |
| 2,203,979 | Blood | June 11, 1940 |
| 2,301,264 | Emery | Nov. 10, 1942 |
| 2,498,951 | Froese | Feb. 28, 1950 |
| 2,586,236 | Lewis et al. | Feb. 19, 1952 |
| 2,613,483 | Lewis et al. | Oct. 14, 1952 |
| 2,651,219 | Tower et al. | Sept. 8, 1953 |
| 2,729,987 | Bluemink | Jan. 10, 1956 |